United States Patent [19]

Lewis

[11] Patent Number: 5,829,929
[45] Date of Patent: Nov. 3, 1998

[54] LONG BIT HOLE SAW ARBOR

[76] Inventor: Michael P. Lewis, P.O. Box 5122, Mansfield, Ohio 44901

[21] Appl. No.: 853,356

[22] Filed: May 8, 1997

[51] Int. Cl.⁶ ..................................................... B23B 51/04
[52] U.S. Cl. ............................................ 408/204; 408/209
[58] Field of Search .................................... 408/204, 206, 408/207, 209, 703, 233

[56] References Cited

U.S. PATENT DOCUMENTS

| | | | |
|---|---|---|---|
| 1,354,830 | 10/1920 | Janes, III | 408/67 |
| 1,596,197 | 8/1926 | Lindgren | 408/206 |
| 1,855,873 | 4/1932 | Shortell | 408/206 |
| 2,140,192 | 12/1938 | Thatcher | 408/206 |
| 2,484,150 | 10/1949 | Brown | 408/204 |
| 3,648,508 | 3/1972 | Hougen | 408/204 |
| 5,433,560 | 7/1995 | Duncan | 408/206 |

FOREIGN PATENT DOCUMENTS

| 1001133 | 8/1965 | United Kingdom | 408/204 |
|---|---|---|---|

*Primary Examiner*—Daniel W. Howell

[57] ABSTRACT

A new long bit hole saw arbor for allowing a user to drill a hole in a material using readily available EMT conduit as a cutting saw member. The inventive device includes an arbor member, an attachment shank extending from the arbor member to permit mounting of the invention to a power tool, a saw member inserted into the arbor member, and a chuck member and a drill bit extending from the arbor member through the saw member.

9 Claims, 3 Drawing Sheets

LONG BIT HOLE SAW ARBOR

BACKGROUND OF THE INVENTION

1. Field of the Invention

The present invention relates to and more particularly pertains to a new long bit hole saw arbor for allowing a user to drill a hole in a material using readily available EMT conduit as a cutting saw member.

2. Description of the Prior Art

The use of hole saw arbors is known in the prior art. More specifically, hole saw arbors heretofore devised and utilized are known to consist basically of familiar, expected and obvious structural configurations, notwithstanding the myriad of designs encompassed by the crowded prior art which have been developed for the fulfillment of countless objectives and requirements.

Known prior art hole saw arbors include U.S. Pat. No. 5,108,235; U.S. Pat. No. 5,096,341; U.S. Pat. No. Des. 282,369; U.S. Pat. No. 4,072,441; U.S. Pat. No. 5,061,126; and U.S. Pat. No. 5,205,685.

While these devices fulfill their respective, particular objectives and requirements, the aforementioned patents do not disclose a new long bit hole saw arbor. The inventive device includes an arbor member, an attachment shank extending from the arbor member to permit mounting of the invention to a power tool, a saw member inserted into the arbor member, and a chuck member and a drill bit extending from the arbor member through the saw member.

In these respects, the long bit hole saw arbor according to the present invention substantially departs from the conventional concepts and designs of the prior art, and in so doing provides an apparatus primarily developed for the purpose of allowing a user to drill a hole in a material using readily available EMT conduit as a cutting saw member.

SUMMARY OF THE INVENTION

In view of the foregoing disadvantages inherent in the known types of hole saw arbors now present in the prior art, the present invention provides a new long bit hole saw arbor construction wherein the same can be utilized for allowing a user to drill a hole in a material using readily available EMT conduit as a cutting saw member.

The general purpose of the present invention, which will be described subsequently in greater detail, is to provide a new long bit hole saw arbor apparatus and method which has many of the advantages of the hole saw arbors mentioned heretofore and many novel features that result in a new long bit hole saw arbor which is not anticipated, rendered obvious, suggested, or even implied by any of the prior art hole saw arbors, either alone or in any combination thereof.

To attain this, the present invention generally comprises an arbor member, an attachment shank extending from the arbor member to permit mounting of the invention to a power tool, a saw member inserted into the arbor member, and a chuck member and a drill bit extending from the arbor member through the saw member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new long bit hole saw arbor apparatus and method which has many of the advantages of the hole saw arbors mentioned heretofore and many novel features that result in a new long bit hole saw arbor which is not anticipated, rendered obvious, suggested, or even implied by any of the prior art hole saw arbors, either alone or in any combination thereof.

It is another object of the present invention to provide a new long bit hole saw arbor which may be easily and efficiently manufactured and marketed.

It is a further object of the present invention to provide a new long bit hole saw arbor which is of a durable and reliable construction.

An even further object of the present invention is to provide a new long bit hole saw arbor which is susceptible of a low cost of manufacture with regard to both materials and labor, and which accordingly is then susceptible of low prices of sale to the consuming public, thereby making such long bit hole saw arbor economically available to the buying public.

Still yet another object of the present invention is to provide a new long bit hole saw arbor which provides in the apparatuses and methods of the prior art some of the advantages thereof, while simultaneously overcoming some of the disadvantages normally associated therewith.

Still another object of the present invention is to provide a new long bit hole saw arbor for allowing a user to drill a hole in a material using readily available EMT conduit as a cutting saw member.

Yet another object of the present invention is to provide a new long bit hole saw arbor which includes an arbor member, an attachment shank extending from the arbor member to permit mounting of the invention to a power tool, a saw member inserted into the arbor member, and a chuck member and a drill bit extending from the arbor member through the saw member.

Still yet another object of the present invention is to provide a new long bit hole saw arbor that can cleanly cut through a wide sort of materials such as sheet rock, wood, brick, and cement blocks.

Even still another object of the present invention is to provide a new long bit hole saw arbor that permits the cutting of various sized holes depending on the length and diameter of the saw member used.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
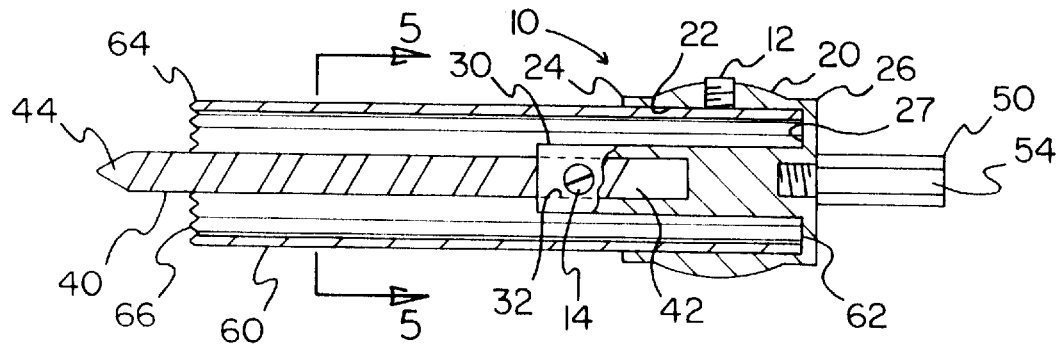
FIG. 1 is a partially broken away side view of a new long bit hole saw arbor according to the present invention.
Figure 2:
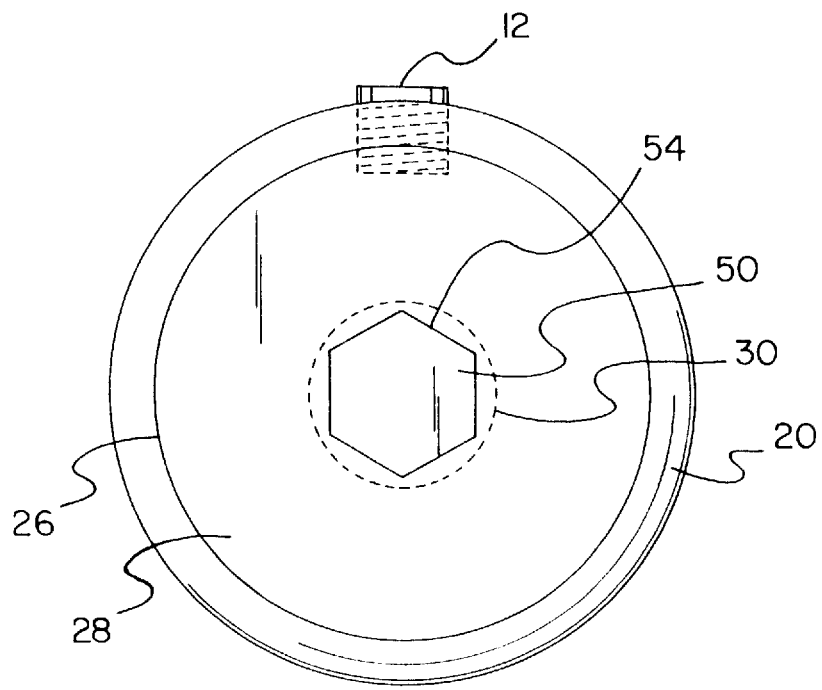
FIG. 2 is a side view from the proximal end of the present invention.
Figure 3:
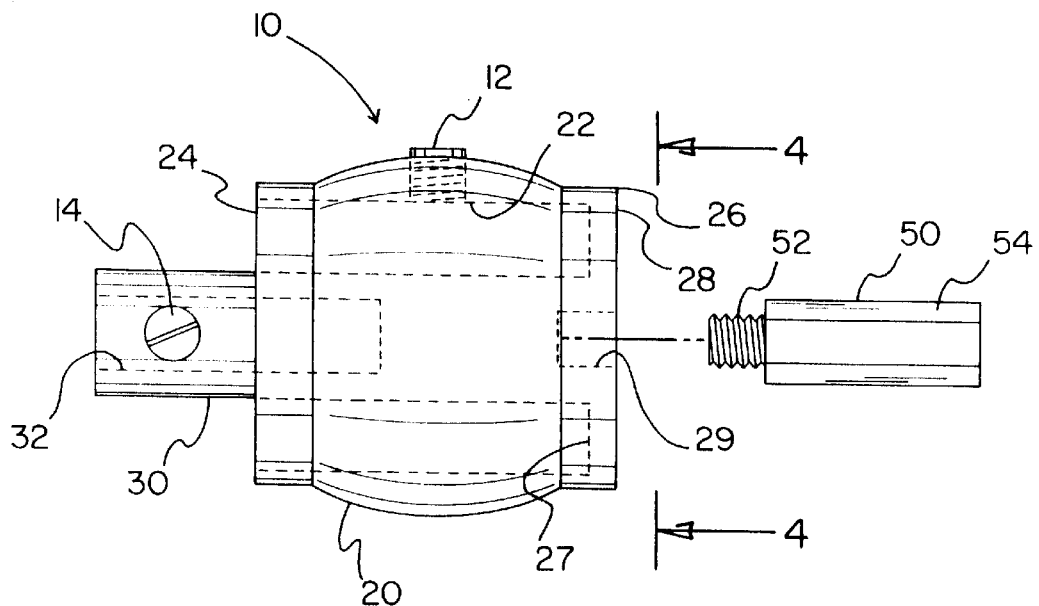
FIG. 3 is an exploded side view of the present invention showing the detachable attachment shank and the arbor member.
Figure 4:
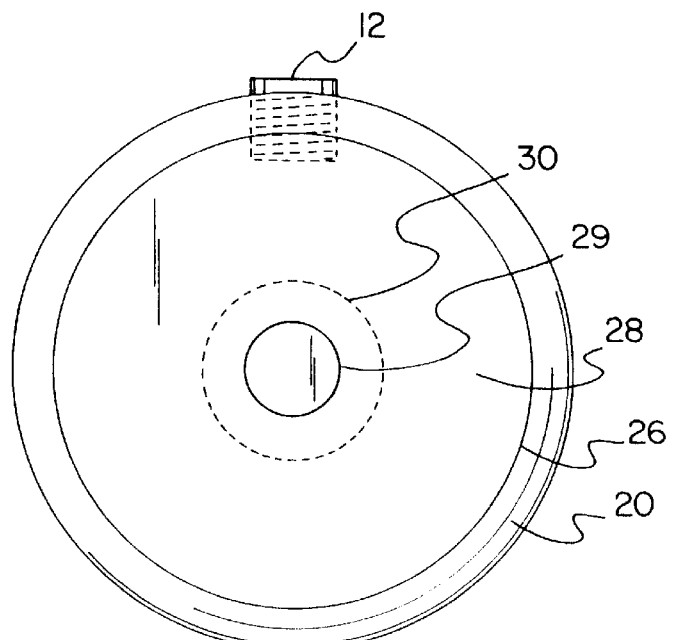
FIG. 4 is a side view of the present invention taken from line 4—4 of FIG. 3.
Figure 5:
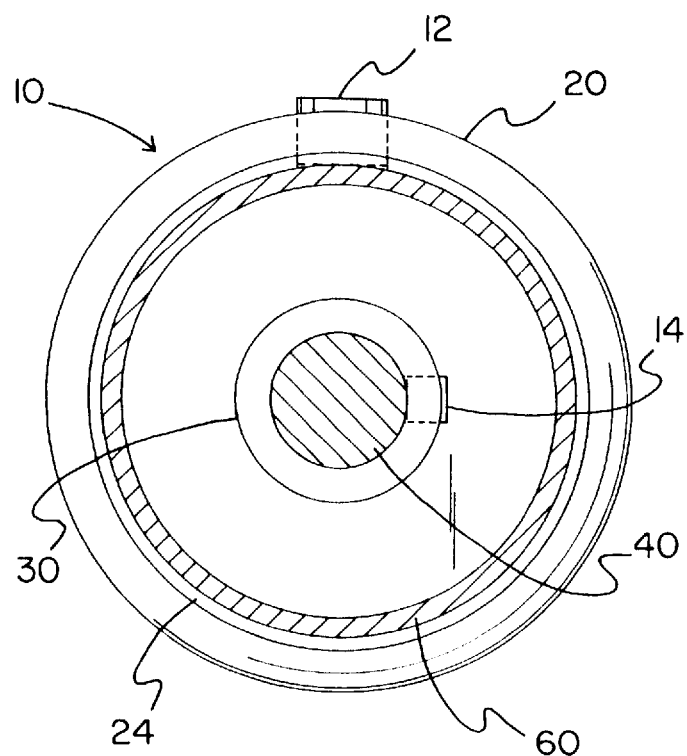
FIG. 5 is a cross sectional view taken along line 5—5 of FIG. 1.

With reference now to the drawings, and in particular to FIGS. 1 through 5 thereof, a new long bit hole saw arbor embodying the principles and concepts of the present invention and generally designated by the reference numeral 10 will be described.

As best illustrated in FIGS. 1 through 5, the long bit hole saw arbor 10 comprises an arbor member 20, an attachment shank 50 extending from the arbor member 20, a saw member 60 inserted into the arbor member 20, and a chuck member 30 and a drill bit extending from the arbor member 20 through the saw member 60.

The arbor member 20 has a cylindrical hollow interior 22 and a closed proximal end 26. The distal end 24 of the arbor member 20 is open to provide access into the hollow interior 22.

The chuck member 30 extends from the interior face 27 of the arbor member proximal 26 end towards the arbor member distal end 24. The chuck member 30 has a drill bit bore 32 that accepts the attachment shank 42 of the drill bit 40.

Preferably, a second set screw 14 is extended through the chuck member 30 into the chuck member drill bit bore 32 to secure the drill bit attachment shank 42 within the chuck member drill bit bore 32 such that the drill bit 40 rotates with the arbor member 20 when the arbor member 20 is rotated. Ideally, the chuck member 30 extends through the distal end 24 to provide easier access to the a second set screw 14.

The attachment shank member 50 extends from the proximal end exterior face 28 of the arbor member 20. Preferably, the attachment shank member 50 is detachably attached to the proximal end exterior face 28 by mounting the threaded end 52 of the attachment shank member 50 into the threaded attachment bore 29 on the proximal end 26. The attachment shank member 50 is designed to permit its mounting on to a drilling tool (not shown), such as a power drill, to allow rotation of the long bit hole saw arbor 10 by the drilling tool. Ideally, the attachment shank member has wrench flats 54 for permitting mounting to a power drill chuck.

The tubular-shaped saw member 60 has open and opposing proximal and distal ends 62,64. On its distal end 64, the saw member 60 has a plurality of cutting teeth 66 that are designed for cutting circular holes into material such as brick, wood, brick, cement blocks, and sheet rock, when the saw member 60 is rotated. The saw member 60 is attached to the arbor member 20 by inserting the proximal end 62 through the arbor member open distal end 24 into the arbor member hollow interior 22. Preferably, the saw member proximal end 62 is positioned adjacent the interior face 27 of arbor member proximal end 26.

Preferably, a first set screw 12 is extended through the arbor member 20 into the arbor member hollow interior 22 to secure the saw member 60 within the arbor member hollow interior 22 so that the saw member 60 will rotate with the arbor member 20 when the arbor member 20 is rotated.

The saw member 60 is positioned in the hollow interior 22 so that it is radially disposed around the chuck member 30 and the drill bit 40. Also preferably, the drilling tip 44 of the drill bit 40 extends through the saw member distal end 64 so that the drilling tip 44 can be used as a drilling guide when drilling into a material with the long bit hole saw arbor 10. Ideally, the saw member 60 is made from EMT conduit or other appropriate metal conduit. The saw member 60 may be of any length and diameter to permit the cutting of various diameter and depth holes in a material.

In use, the attachment shank member 50 is mounted on a power drill. The long bit hole saw arbor 10 is then positioned so that the drill tip 44 is touching the surface of the material that a hole is desired. As the long bit hole saw arbor 10 is rotated by the power drill, the drill bit 40 drills into the material so that the cutting teeth 66 of the saw member 60 eventually come into contact with the surface of the material at start cutting into the material. The cutting teeth 66 cut into the material 7until the desired hole in the material is made.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A long bit hole saw arbor, comprising:

an arbor member having a cylindrical hollow interior, an open distal end into said hollow interior, and a closed proximal end;

said arbor member further having a chuck member portion being extended from said arbor member proximal end outwardly through said open distal end such that said chuck member extends beyond said open distal end of said arbor member, said chuck member portion having a drill bit bore;

a drill bit having a drilling tip and an attachment shank, said drill bit attachment shank being accepted by said chuck member drill bit bore;

a mounting means for mounting said arbor member on a drilling tool to permit rotation of said arbor member; and a tubular saw member having an open distal end and an open proximal end, said open distal end of said tubular saw member extending outwardly past a distal end of said chuck member portion, said saw member distal end having a plurality of cutting teeth for cutting into a material when said saw member is rotated, said proximal end being inserted through said arbor member open distal end into said arbor member hollow interior, said saw member being radially disposed around said chuck member portion and said drill bit.

2. The long bit hole saw arbor of claim 1, wherein said mounting means further comprises an attachment shank member being extended from said arbor member closed proximal end, said attachment shank member being for mounting on a drilling tool to permit rotation of said long bit hole saw arbor.

3. The long bit hole saw arbor of claim 2, wherein said attachment shank member is detachably attached to said arbor member closed proximal end.

4. The long bit hole saw arbor of claim 1, wherein said closed proximal end has an interior face and an exterior face, and wherein said saw member proximal end being positioned adjacent said arbor member proximal end interior face.

5. The long bit hole saw of claim 1, further comprising a first set screw being extended through said arbor member into said arbor member hollow interior for securing said saw member within said arbor member hollow interior such that said saw member rotates when said arbor member is rotated.

6. The long bit hole saw of claim 1, further comprising a second set screw being extended through said chuck member portion into said chuck member drill bit bore for securing said drill bit attachment shank within said chuck member drill bit bore such that said drill bit rotates when said arbor member is rotated.

7. The long bit hole saw arbor of claim 1, wherein said drill bit drilling tip is extended through said saw member distal end.

8. A long bit hole saw arbor, comprising:

an arbor member having an outer perimeter defining a cylindrical hollow interior, said arbor member further having an open distal end into said hollow interior and a closed proximal end, said closed proximal end having an interior face and an exterior face;

a chuck member integral to said arbor member, said chuck member being extended from said arbor member proximal end interior face outwardly through said open distal end, said chuck member having a drill bit bore;

a drill bit having a drilling tip and an attachment shank, said drill bit attachment shank being accepted by said chuck member drill bit bore, said drilling tip being adapted for drilling into a material;

an attachment shank member being detachably attached to said arbor member closed proximal end exterior face, said attachment shank member being for mounting on a drilling tool to permit rotation of said long bit hole saw arbor;

a tubular saw member having an open distal end and an open proximal end, said saw member distal end having a plurality of cutting teeth adapted for cutting into a material when said saw member is rotated, said proximal end being inserted through said arbor member open distal end into said arbor member hollow interior, said saw member proximal end being positioned adjacent said arbor member proximal end interior face, said saw member being radially disposed around said chuck member and said drill bit, said drill bit drilling tip being extended through said saw member distal end;

a first set screw being extended through said arbor member into said arbor member hollow interior for securing said saw member within said arbor member hollow interior such that said saw member rotates when said arbor member is rotated;

said chuck member further being structured to have a threaded aperture for receiving a second set screw through said chuck member into said chuck member drill bit bore for securing said drill bit attachment shank within said chuck member drill bit bore such that said drill bit rotates when said arbor member is rotated, said aperture being positioned on a portion of said chuck member extended outwardly beyond said open distal end of said arbor member such that said second set screw is positioned outside the hollow interior of the arbor member for facilitating access to said second set screw.

9. The long bit hole saw arbor of claim 1 wherein said arbor member and said chuck member are integrally formed from a single piece of material for resisting rotation of said chuck member with respect to said arbor member.

* * * * *